United States Patent [19]
Okamoto et al.

[11] Patent Number: 6,136,410
[45] Date of Patent: *Oct. 24, 2000

[54] MAGNETIC RECORDING MEDIUM

[75] Inventors: Kazuhiro Okamoto; Takao Kudo; Yuichi Sasaki; Taro Ohmura, all of Miyagi, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,235

[22] Filed: Oct. 3, 1996

[30] Foreign Application Priority Data

Oct. 6, 1995  [JP]  Japan .................................... 7-259912

[51] Int. Cl.$^7$ .................................................. G11B 5/714
[52] U.S. Cl. ......................... 428/141; 428/323; 428/336; 428/694 BR; 428/694 BN; 428/694 BS
[58] Field of Search ..................... 428/694 BA, 694 BR, 428/694 BS, 141, 323, 332, 333, 336, 328, 694 BN

[56] References Cited

U.S. PATENT DOCUMENTS 5,258,223  11/1993  Inaba et al. .
5,326,618  7/1994  Ryoke et al. ..................... 428/694 BA
5,385,779  1/1995  Miura et al. .
5,637,390  6/1997  Isobe et al. ....................... 428/694 BA

FOREIGN PATENT DOCUMENTS 0 515 748 A2  7/1991  European Pat. Off. .
0 582 472 A1  8/1993  European Pat. Off. .

*Primary Examiner*—Christopher D. Rodee
*Attorney, Agent, or Firm*—Hill & Simpson

[57] ABSTRACT

To enable high density mass storage recording, for an upper magnetic layer, the length of a major axis of metallic magnetic powder, the type of binder, the hardness and particle size of abrasive powder, the condition of kneading, surface roughness and thickness are regulated, for a lower nonmagnetic layer, the length of a major axis of nonmagnetic powder, the ratio of the length of a major axis to that of a minor axis and the type of binder are regulated and further, a method of forming the upper magnetic layer and the lower nonmagnetic layer, the thickness of a nonmagnetic base material and Young's modulus are regulated.

5 Claims, 1 Drawing Sheet

MAGNETIC RECORDING MEDIUM

BACKGROUND OF THE INVENTION

1. Field of the Invention

The present invention relates to a laminated coat-type magnetic recording medium, particularly relates to the improvement of its characteristics of electromagnetic transduction and its durability in running in a high density mass storage recording area.

2. Description of the Related Art

For a magnetic recording medium, a so-called coat-type magnetic recording medium the magnetic layer of which is formed by coating a nonmagnetic base material with magnetic coating which is prepared by dispersing ferromagnetic powder, binder and a variety of additives together with an organic solvent and drying it is known and for the above ferromagnetic powder, a metallic particulate is used for densifying recording.

A coat-type magnetic recording medium using such a metallic particulate is used as a recording medium for a computer such as a high density floppy disk and a data cartridge for backup in addition to audio or video magnetic tape, forms a mainstream of a magnetic recording medium at present and the characteristics have been also remarkably enhanced.

To densify recording on a coat-type magnetic recording medium, it is important to smooth the surface of a medium as much as possible so as to minimize vain space and to reduce the loss of output due to demagnetization in addition to using a metallic particulate as ferromagnetic powder.

For a method of achieving these purposes, (1) increasing the coercive force and saturation magnetization of ferromagnetic powder, (2) unifying the distribution of the coercive force of ferromagnetic powder, (3) providing vertical anisotropy and (4) thinning a magnetic layer can be given.

Methods (1) and (2) of these are ones of increasing output directly. For such improvement of coercive force and saturation magnetization, the composition of an element constituting ferromagnetic powder is examined, and a metallic particulate the coercive force of which exceeds 160 kA/m and further, a metallic particulate the saturation magnetization of which exceeds 140 $Am^2/kg$ are developed. The distribution of coercive force is related to the particle size distribution of ferromagnetic powder and is also remarkably improved by unifying the size of a particle.

The method of providing vertical anisotropy (3) is one for densifying vertical magnetic recording. In the case of a coat-type magnetic recording medium, vertical anisotropy is provided mainly by controlling the magnetic orientation of ferromagnetic powder. For example, if an acicular particle is used, vertical orientation processing or oblique orientation processing is tried for a coating film. However, such orientation processing is not made practicable yet because of a problem such as the difficulty of controlling orientation and the turbulence of the surface of a coating film by orientation.

Next, for a method of thinning a magnetic layer (4), it is conceivable that it is very effective to reduce loss by self-demagnetization.

If a magnetic layer is simply thinned until it is 1 $\mu$m or less thick for example, the shape of the surface of the nonmagnetic base material readily emerges on the surface of the magnetic layer and the surface of the magnetic layer cannot be smoothed. Therefore, if a magnetic layer is thinned, a nonmagnetic coating layer is often inserted between a nonmagnetic base material and a magnetic layer. The thickness between the surface of the nonmagnetic base material and the surface of the magnetic layer is increased by inserting the nonmagnetic layer as described above and the shape of the surface of the nonmagnetic base material seldom emerges on the surface of the magnetic layer. Therefore, a thin magnetic layer with the smooth surface is formed.

For such a laminated coat-type magnetic recording medium, a variety of improvements are proposed and for example, a method of forming the coating of the lower nonmagnetic layer so that it is 0.5 to 3.5 $\mu$m thick which is disclosed in Japanese published unexamined patent application No. Sho63-187418, a method of adding a proper quantity of carbon black in the lower nonmagnetic layer which is disclosed in Japanese published unexamined patent application No. H4-238111, a method of coating the surface of the nonmagnetic oxide of the lower nonmagnetic layer with an inorganic matter which is disclosed in Japanese published unexamined patent application No. H5-182177, a method of using two types or more of nonmagnetic powders which are different in size of a particle for the lower nonmagnetic layer which is disclosed in Japanese published unexamined patent application No. H5-274651, a method of limiting the standard deviation of the thickness of the upper magnetic layer in the specific range which is disclosed in Japanese published unexamined patent application No. H5-298653 and a method of constituting the upper magnetic layer by two or more magnetic layers which is disclosed in Japanese published unexamined patent applications No. H6-162485 and No. H6-162489 are reported.

A method of forming the lower nonmagnetic layer and the upper magnetic layer is also examined and a simultaneous laminated coating system (a wet-on-wet coating system) in which nonmagnetic coating and magnetic coating are simultaneously applied on a nonmagnetic base material using a die head provided with two slits through which nonmagnetic coating and magnetic coating are respectively pushed out is proposed. According to this simultaneous laminated coating system, a coating film of uniform thickness with few defects or unevenness can be formed. Therefore, a medium with little noise which is excellent in an electromagnetic transduction characteristic can be obtained. The adhesion between formed upper and lower layers is high and excellent durability can be obtained.

For this simultaneous laminated coating system, it is important to adjust the characteristics of upper and lower coating. From such a viewpoint, a method of using a solvent poorer than binder as a solvent used for preparing coating for upper and lower layers which is disclosed in Japanese published unexamined patent application No. Sho63-31028, a method of equalizing parameters of the solubility of coating for upper and lower layers which is disclosed in Japanese published unexamined patent application No. H3-119518, a method of equalizing Reynolds numbers of coating for upper and lower layers which is disclosed in Japanese published unexamined H4-271016, a method of providing equal or substantially equal degree of thixotropy to coating for upper and lower layers which is disclosed in Japanese published unexamined patent application No. H4-325917, a method of fitting the flow curve of coating to a specific expression which is disclosed in Japanese published unexamined patent application No. H5-128496, a method of specifying a flow index when coating is spread which is disclosed in Japanese published unexamined patent application No. H5-208165, a method of specifying the creep deformation quantity of coating which is disclosed in Japanese published unexamined patent application No. H6-195690 and a method of fixing the ratio of the maximal and minimum values of the loss elasticity of coating which is disclosed in Japanese published unexamined patent application H5-266463 are proposed.

As the surface of a laminated coat-type magnetic recording medium is formed so that it is very smooth, the area which is in contact with a variety of sliding members when the recording medium is run on a recording reproducer is large and the coefficient of friction with these sliding members is large. Therefore, it is difficult to obtain high durability in running. In addition, recently magnetic tap has a tendency to be thinned to extend the length of a tape which can be housed in a cassette and increase recording capacity per cassette. Therefore, it is more difficult to obtain high durability.

Therefore, a method of adjusting the quantity of lubricant used for an upper layer which is disclosed in Japanese published unexamined patent applications No. H1-224919 and No. H5-183178 and a method of using fluoric lubricant as lubricant which is disclosed in Japanese published unexamined patent applications No. H2-192018 and No. H5-298679 are also proposed.

As described above, for a laminated coat-type magnetic recording medium, a variety of improvements are proposed, however, particularly information related to the electromagnetic transduction characteristic in a high density recording area and durability in running in case such a recording medium is thinned is insufficient and examination related to them is further requested.

SUMMARY OF THE INVENTION

The present invention i as made in view of such conventional situations and the object is to provide a magnetic recording medium wherein a satisfactory electromagnetic transduction characteristic can be obtained in a high density recording area, satisfactory durability in running can be obtained even if the medium is thinned and high density mass storage recording is enabled.

To achieve the above object, a magnetic recording medium according to the present invention wherein a lower nonmagnetic layer formed by dispersing nonmagnetic powder in binder is formed on a nonmagnetic base material and an upper magnetic layer formed by dispersing ferromagnetic powder in binder is formed on this lower nonmagnetic layer is characterized in that ferromagnetic powder included in the above upper magnetic layer is metallic magnetic powder, and the mean value L of the length of a major axis and the standard deviation a of the length of a major axis meet an expression "0.01 $\mu$m<L±2σ<0.33 $\mu$m".

The magnetic recording medium according to the present invention is also characterized in that 50 percent by weight or more of binder included in the upper magnetic layer is a vinyl chloride copolymer the average degree of polymerization of which is 180 or less and which includes metallic salt sulfonate as a polar group.

The magnetic recording medium according to the present invention is further characterized in that the upper magnetic layer is formed by applying magnetic coating which is prepared by kneading and dispersing ferromagnetic powder and binder together with a solvent on the lower nonmagnetic layer, and the quantity of the non-volatile component of the above magnetic coating in kneading is 80 to 90 percents by weight.

The magnetic recording medium according to the present invention is further characterized in that the surface roughness Ra which is measured by a noncontact optical surface roughness meter of the upper magnetic layer is 4 nm or less and this surface roughness Ra is smaller than that of the surface of the nonmagnetic base material the surface roughness Ra of which is smaller than that of another surface.

The magnetic recording medium according to the present invention is further characterized in that the above upper magnetic layer is formed by applying magnetic coating which is prepared by adding abrasive powder slurry formed by dispersing abrasive powder together with binder in a solvent to kneaded matter formed by kneading ferromagnetic powder and binder together with a solvent on the lower nonmagnetic layer, abrasive powder included in abrasive powder slurry is inorganic powder Mohs' hardness of which is 6 or more and the mean primary particle size of which is smaller than 0.10 $\mu$m and the central particle size of abrasive powder in abrasive powder slurry is smaller than 0.20 $\mu$m immediately before it is added to the kneaded matter.

The magnetic recording medium according to the present invention is further characterized in that the thickness of the above upper magnetic layer is 0.05 to 0.2 $\mu$m, is ⅕ or less of the total thickness of the lower nonmagnetic layer and the upper magnetic layer and is ¹⁄₂₀ or less of the thickness of the medium, the thickness of the nonmagnetic base material is 5 $\mu$m or less, and Young's modulus of the nonmagnetic base material is 1000 kg/mm² or more.

The magnetic recording medium according to the present invention is further characterized in that the length of a major axis of nonmagnetic powder included in the above lower nonmagnetic layer is shorter than 0.2 $\mu$m and the length of a major axis/minor axis is longer than the length of the major axis/minor axis of ferromagnetic powder included in the upper magnetic layer.

The magnetic recording medium according to the present invention is further characterized in that nonmagnetic powder included in the lower nonmagnetic layer is hematite the surface of which is coated by at least either of an aluminum compound or a silicon compound.

The magnetic recording medium according to the present invention is further characterized in that 50 percent by weight or more of binder included in the lower nonmagnetic layer is a vinyl chloride copolymer the average degree of polymerization of which is 180 or less and which includes metallic salt sulfonate as a polar group.

The magnetic recording medium according to the present invention is further characterized in that binder accounting for 50 percents by weight or more of binder included in the upper magnetic layer and binder accounting for 50 percents by weight or more of binder included in the lower nonmagnetic layer are the same.

The magnetic recording medium according to the present invention is furthermore characterized in that the lower nonmagnetic layer and the upper magnetic layer are formed by applying magnetic coating on a nonmagnetic coating film while the nonmagnetic coating film is wet after the nonmagnetic coating film is formed by applying nonmagnetic coating on the nonmagnetic base material.

DESCRIPTION OF THE PREFERRED EMBODIMENTS

Figure 1:
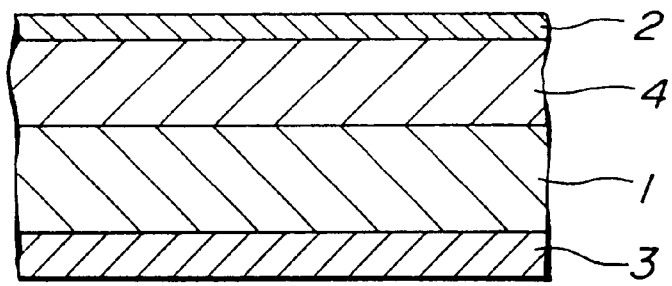
FIG. 1 is a schematic sectional view showing a constitutional example of a magnetic recording medium to which the present invention is applied.

Concrete embodiments according to the present invention will be described below.

A magnetic recording medium to which the present invention is applied is a laminated coat-type magnetic recording medium which is constituted by forming a lower nonmagnetic layer formed by dispersing nonmagnetic powder in binder on a nonmagnetic base material and forming an upper magnetic layer formed by dispersing ferromagnetic powder in binder on the lower nonmagnetic layer.

The upper magnetic layer and the lower nonmagnetic layer of this laminated coat-type magnetic recording medium are formed by respectively applying and drying magnetic coating for an upper layer which is prepared by kneading and dispersing ferromagnetic powder and binder together with an organic solvent and nonmagnetic coating for a lower layer which is prepared by kneading and dispersing nonmagnetic powder and binder together with an organic solvent.

To enable high density mass storage recording on such a laminated coat-type magnetic recording medium, three conditions consisting of (a) using metallic powder consisting of a particulate as magnetic powder and dispersing metallic powder consisting of such a particulate in the upper magnetic layer sufficiently to fill the layer with the metallic powder, (b) designing the lower nonmagnetic layer so that the surface is smooth and (c) thinning the upper magnetic layer, the lower nonmagnetic layer and the medium itself are required to be met.

In the present invention, from such a viewpoint, for the upper magnetic layer, metallic magnetic powder is used for magnetic powder, and the type of binder, the hardness and the particle size of abrasive powder, the condition of kneading coating, surface roughness Ra and thickness in addition to the length of a major axis are regulated. For the lower nonmagnetic layer, the length of a major axis, the ratio of the length of a major axis to that of a minor axis, the type of included nonmagnetic powder and the type of binder are regulated. Further, the method of forming these upper magnetic layer and lower nonmagnetic layer, the thickness of the nonmagnetic base material and Young's modulus are regulated.

These will be described in detail below.

First, the upper magnetic layer shall be formed by dispersing ferromagnetic powder in the magnetic layer evenly as described above and filling the layer with the powder.

First, for ferromagnetic powder, metal such as Fe, Co and Ni, an alloy such as Fe—Co, Fe—Ni, Fe—Al, Fe—Ni—Al, Fe—Al—P, Fe—Ni—Si—Al, Fe—Ni—Si—Al—Mn, Fe—Mn—Zn, Fe—Ni—Zn, Co—Ni, Co—P, Fe—Co—Ni, Fe—Co—Ni—Cr, Fe—Co—Ni—P, Fe—Co—B, Fe—Co—Cr—B, Mn—Bi, Mn—Al and Fe—Co—V and powder consisting of iron nitride and iron carbide or a combination of two types or more of the above are used. A suitable quantity of light metal elements such as Al, Si, P and B may be included in such ferromagnetic powder to prevent sintering in reduction or to maintain a shape. Metallic magnetic powder is desirable of these and generally, at least either of Al or Si is added to Fe or an alloy such as Fe—Co, Fe—Ni and Fe—Co—Ni to prevent sintering.

They say it is desirable that the specific surface of such ferromagnetic powder is 20 to 90 $m^2/g$, preferably 25 to 70 $m^2/g$. It is because if the specific surface is in this range, ferromagnetic powder is a particulate in most cases, a noise characteristic is improved and high density recording is enabled.

However, in the case of metallic powder, it is difficult to say that specific surface directly reflects the size of a particle. The reason is as follows:

That is, the minute structure of metallic powder is constituted by thee layers of a cylinder made of pure metal, a core made of iron oxide and a core made of light metal from the inside if the structure is assumed to be cylindrical. In the case of metallic powder, the total density (mean density) is readily varied by changing the ratio of these three layers a little. Therefore, specific surface shown as surface area per unit weight also varies depending upon the ratio of these three layers independent of actual surface area.

Further, a metallic particle has irregularities formed in deoxidizing on the surface. Therefore, these irregularities increase surface area independent of the size of a particle itself. Because of the effect of such density and irregularities on the surface, for a metallic particulate, it is impossible to say a particle the specific surface of which is large is a particulate.

Therefore, if the size of a metallic particle is evaluated, it is realistic to directly measure the dimension of such a particle.

In the present invention, based upon the above examinations, the mean value L and the standard deviation $\sigma$ of the length 1 of a major axis of a metallic particle measured in a picture taken via a transmission type electron microscope is regulated so that they meet a condition "0.01 $\mu$m<L±2$\sigma$<0.33 $\mu$m. A magnetic recording medium provided with an excellent electromagnetic transduction characteristic and a noise characteristic can be obtained by using a metallic particle which meets such a condition for the upper magnetic layer. If "L±2$\sigma$" of a metallic particle is 0.01 $\mu$m or less, dispersion in preparing magnetic coating is extremely difficult and superparamagnetism may emerge. If "L±2$\sigma$" is 0.33 $\mu$m or more, particles called so-called particle length less which do not contribute to the reproduction of recording are increased and a noise characteristic may also be deteriorated.

Further, it is desirable that a metallic particle is small in the range in which the ratio of the length of a major axis to a minor axis holds formal anisotropy. Normally, the ratio is selected in the range of 2 to 15 and it is desirable that the ratio is in the range of 3 to 10. If the ratio is smaller than 2, the orientation of ferromagnetic powder is deteriorated and output is reduced. If the ratio exceeds 15, the output of a signal with a short wavelength may be deteriorated.

One type of ferromagnetic powder may be used and two types or more may be also used.

Next, binder used for the upper magnetic layer will be described.

If generally, a particle dispersed in binder is miniaturized, space between particles is also miniaturized if no change is made in its geometric arrangement. To wet such minute space between particles, coat a particle with binder evenly and disperse it, it is required that binder is provided with strong affinity with ferromagnetic powder and excellent fluidity.

In the present invention, a vinyl chloride copolymer the average degree of polymerization is 180 or less and which includes metallic salt sulfonate as a polar group is used as the binder for the upper layer. This vinyl chloride copolymer meets the above-described requirements and can disperse ferromagnetic powder evenly. The average degree of polymerization is optimized in view of mainly the fluidity of binder. If this average degree of polymerization is 180 or more, the fluidity of binder is deteriorated and the capability of dispersing particulates is deteriorated. Metallic salt sulfonate is doped to improve affinity with ferromagnetic powder. For this metallic salt sulfonate, alkaline metallic salt such as lithium, potassium and sodium may be selected.

The binder for a magnetic layer is not necessarily required to be constituted by only a vinyl chloride copolymer. If this vinyl chloride copolymer is included by 50 percents by weight or more, another type of binder may be used together to improve practical characteristics such as the running performance and durability of a magnetic recording medium, the contact with a head, the strength and stiffness of a coating film and the adhesion of a base.

As such binder, well-known thermoplastic resin, thermosetting resin and reaction series resin which are used as binder for a magnetic recording medium heretofore are used and binder with the average molecular weight of 5,000 to 100,000 is particularly desirable.

For thermoplastic resin, vinyl chloride, vinyl acetate, a copolymer of vinyl chloride and vinyl acetate, a copolymer of vinyl chloride and vinylidene chloride, a copolymer of vinyl chloride and acrylonitrile, a copolymer of acrylic ester and acrylonitrile, a copolymer of acrylic ester, vinyl chloride and vinylidene chloride, a copolymer of vinyl chloride and acrylonitrile, a copolymer of acrylic ester and acrylonitrile, a copolymer of acrylic ester and vinylidene chloride, a copolymer of ester methacrylate and vinylidene chloride, a copolymer of ester methacrylate and vinyl chloride, a copolymer of ester methacrylate and ethylene, a copolymer of polyvinyl fluoride, vinylidene chloride and acrylonitrile, a copolymer of acrylonitrile and butadiene, polyamide resin, polyvinyl butyral, cellulosic (cellulose acetate butyrate, cellulose diacetate, cellulose triacetate, cellulose propionate, nitrocellulose), a copolymer of stylene and butadiene, polyurethane resin, polyester resin, amino resin and synthetic rubber can be given.

For thermmosetting resin, phenol resin, epoxy resin, polyurethane resin, urea resin, melamine resin, alkyd resin, silicone resin, polyamine resin and urea formaldehyde resin may be used.

In binder for the above all, side chain amine expressed by —$SO_3M$, —$OSO_3M$, —COOM, P=0$(OM)_2$ (however, the above M denotes a hydrogen atom or alkaline metal such as lithium, potassium and sodium), —$NR_1R_2$ and —$NR_1R_2R_3{}^+X^-$, principal chain amine expressed by >$NR_1R_2{}^+X^-$(however, the above $R_1$, $R_2$ and $R_3$ denote a hydrogen atom or a hydrocarbon radical and $X^-$ denotes halogen element ion such as fluorine, chlorine, bromine and iodine, inorganic ion and organic ion), and further, a polar functional group such as —OH, —SH, —CN and an epoxy radical may be doped to enhance the dispersibility of nonmagnetic pigment. It is desirable that the quantity doped in binder of such a polar functional group is $10^{-1}$ to $10^{-8}$ mole/g and it is preferable that the quantity is $10^{-2}$ to $10^{-6}$ mole/g.

To unify the dispersion of ferromagnetic powder, it is important to regulate the type of binder and the condition of kneading of magnetic coating.

It is desirable that the nonvolatile component of magnetic coating accounts for 80 to 90% in percentage by weight in a kneading process. If the percentage by weight of the nonvolatile component (solid powder component) in a kneading process is smaller than 80%, sufficient pressure cannot be applied to paste and it is difficult that the surface of ferromagnetic powder is fully coated with binder. In the meantime, if the percentage by weight of the nonvolatile component exceeds 90%, the surface of ferromagnetic powder cannot be evenly coated because the fluidity of binder is lost.

For a solvent used for coating, a ketone solvent such as acetone, methyl ethyl ketone, methyl isobutyl ketone and cyclohexanone, an alcoholic solvent such as methanol, ethanol and propanol, an ester solvent such as methyl acetate, ethyl acetate, butyl acetate, propyl acetate, etyl lactate and ethylene glycol acetate, an ether solvent such as diethylene glycol dimetyl ether, dietoxy ethanol, tetrahydrofuran and dioxane, an aromatic hydrocarbon solvent such as benzene, toluene and xylene and a hydrocarbon halide solvent such as methylene chloride, ethylene chloride, carbon tetrachloride, chloroform and chlorobenzene can be given and these are used with them mixed suitably.

For a kneading machine, a heretofore well-known kneader such as a continuous two-shaft kneader, a continuous two-shaft kneader which can be diluted at many stages, a kneader, a pressurizing kneader and a roll kneader may be used, however, a kneading machine is not limited to them.

For a disperser, a roll mill, a ball mill, a horizontal type sand mill, a vertical type sand mill, a spike mill, a pin mill, a tower mill, DCP, an agitator, a homogenizer and a supersonic disperser may be used.

A variety of additives normally used in a magnetic recording medium in addition to ferromagnetic powder and binder may be added to a magnetic layer, however, the size of a particle of abrasive powder of the additives has an important effect upon the surface roughness Ra of the upper magnetic layer. Needless to say, the surface roughness Ra of a medium is more enhanced as a more minute particle is used. Therefore, it is desirable that for this abrasive powder, inorganic powder Moh's hardness of which is 6 or more and the mean primary particle size of which is smaller than 0.10 $\mu$m is used. This mean primary particle size can be measured in a picture taken via a transmission type electron microscope.

If abrasive powder is added, it may be added as powder at the stage of kneading of magnetic coating, however, a method that an abrasive powder slurry is prepared by dispersing abrasive powder together with binder in a solvent and it is added at the stage of kneading of magnetic coating is desirable because dispersibility is enhanced. However, it is desirable that the central particle size of abrasive powder in an abrasive powder slurry immediately before it is added is shorter than 0.2 $\mu$m. The central particle size of abrasive powder in this slurry can be measured by laser beam particle size measurement equipment.

Under the above upper magnetic layer, a lower nonmagnetic layer is formed by dispersing nonmagnetic powder in binder. It is known that in the laminated coat-type magnetic recording medium, a strong correlation between the surface of this lower layer and the surface of the upper layer, that is, between the surface roughness of the lower layer and that of the upper layer is seen and to form the smooth surface of the upper layer, it is essential to form the smooth surface of the lower layer. Therefore, the material of the lower nonmagnetic layer is selected in view of such smoothing of surfaces.

First, for nonmagnetic powder, acicular hematite which is coated with at least either of an aluminum compound or a silicon compound (for example, oxide) is used. The dispersibility of hematite is improved by being coated with an aluminum compound and/or a silicon compound and absorption into lubricant added as an additive is prevented.

Hematite may be coated with either of an aluminum compound or a silicon compound or may be also coated with both.

It is desirable that the ratio of a coating element to iron (that is, Al/Fe, Si/Fe or Al+Si/Fe) of coated hematite is 0.5 to 10 atomic percentage. If this ratio is smaller than 0.5 atomic percentage, the effect by coating is poor. Even if this ratio exceeds 10 atomic percentage, the effect is not further increased in proportion to the added quantity and on the contrary it is not desirable because the surface area of a particle is increased. Hematite may be coated with an aluminum compound and/or a silicon compound and may be also coated with a minute quantity of metallic oxide or light metallic oxide, for example phosphorus and boron.

To form the lower nonmagnetic layer the surface of which is smooth, hematite is required to be coated as described above, the length of a major axis is required to be shorter than 0.2 μm and the ratio of the length of a major axis to a minor axis is required to be larger than that of ferromagnetic powder for the upper magnetic layer.

If the length of a major axis of acicular hematite is 0.2 μm or more, a smooth surface which is fit for high recording density using a short wavelength cannot be obtained. As hematite is nonmagnetic, no magnetic field orientation processing cannot be performed, however, if the hematite has the above-described ratio, it is naturally oriented by shearing force in coating and the smooth surface can be obtained.

In the lower nonmagnetic layer, such coated acicular hematite is included as the principal component of nonmagnetic powder, however, other nonmagnetic pigment may be also used together to improve dispersibility, to make the layer conductive and improve color tone.

For nonmagnetic pigment which may be used together with the acicular hematite, rutile titanium oxide, anatase titanium oxide, carbon black, tin oxide, tungsten oxide, silicon oxide, zinc oxide, chromium oxide, cerium oxide, titanium carbide, BN, α-alumina, β- alumina, γ- alumina, calcium sulfate, barium sulfate, molybdenum disulfide, magnesium carbonate, barium carbonate, strontium carbonate and barium titanate can be given. A suitable quantity of impurities can be doped in each nonmagnetic pigment according to a purpose.

It is desirable that the specific surface area of such nonmagnetic pigment is 5 to 100 $m^2/g$ and further, it is preferable that it is 20 to 70 $m^2/g$. If the specific surface area of nonmagnetic pigment is in the above range, the particle of nonmagnetic pigment is a particulate and the lower nonmagnetic layer becomes smooth. As a result, the upper magnetic layer formed on it also becomes smooth, the modulation noise characteristic of a magnetic recording medium is improved and the loss of space is reduced. If the specific surface area of nonmagnetic pigment is larger than this range, dispersion to coating is difficult and on the contrary, if the specific surface area is too small, the smoothness of the surface of the lower nonmagnetic layer and the upper magnetic layer is deteriorated and characteristics in a high density recording area are deteriorated.

The surface of the lower nonmagnetic layer is formed smoothly by using such nonmagnetic powder, however, in the laminated coat-type magnetic recording medium, further the uniformity of an interface between the upper and lower layers is also important. It is the characteristic of magnetic coating for the upper layer and the characteristic of nonmagnetic coating for the lower layer that are particularly important of factors which control the state of the interface between the upper and lower layers, and further in detail, the characteristics of the viscosity of each coating are particularly important. That is, the greatest attention is required to be paid to the affinity of the characteristics of the viscosity of magnetic coating for the upper layer and nonmagnetic coating for the lower layer.

Therefore, it is desirable that the binder shown in relation to the upper layer, that is, a vinyl chloride copolymer the average degree of polymerization of which is 180 or less and which includes metallic salt sulfonate as a polar group is used for nonmagnetic coating for the lower layer so that it accounts for 50 percents by weight or more of binder. If the type of a vinyl chloride copolymer which accounts for 50 percents by weight or more of binder included in the upper layer is the same as the type of that in the lower layer, affinity between magnetic coating for the upper layer and nonmagnetic coating for the lower layer is increased and a uniform interface can be obtained between the upper and lower layers. The defect of coating such as the unevenness of color, the unevenness of coating, a streak of coating, a partly uncoated phenomenon and a chatter phenomenon can be eliminated.

For this lower nonmagnetic layer, binder is also not necessarily required to be constituted by only a vinyl chloride copolymer the average degree of polymerization of which is 180 or less and which includes metallic salt sulfonate as a polar group and another type of binder may be used together. For binder which is used together with this vinyl chloride copolymer, any binder shown in relation to the upper magnetic layer may be also used.

Any solvent shown in relation to the upper layer which is used for nonmagnetic coating for the lower layer may be also used.

Further, for equipment for preparing nonmagnetic coating for the lower layer, heretofore well-known equipment such as a roll mill, a ball mill, a sand mill, an agitator, a kneader, an extruder, a horizontal type sand mill, a vertical type sand mill, a spike mill, a pin mill, a tower mill, DCP, a homogenizer and a supersonic disperser may be used.

The upper magnetic coating and the lower nonmagnetic coating which are prepared by the above material are applied on a nonmagnetic base material and dried to be respectively the upper magnetic layer and the lower nonmagnetic layer.

For a method of applying two types prepared coatings on a nonmagnetic base material, there are a so-called wet-on-dry coating system which is disclosed in Japanese published unexamined patent application No. H6-236543 wherein first, the lower coating is applied and dried, and the upper coating is applied and dried on this dried lower coating film, and a so-called wet-on-wet coating system (a wet laminated coating system) wherein the upper coating is applied on the wet lower coating film.

Figure 2:
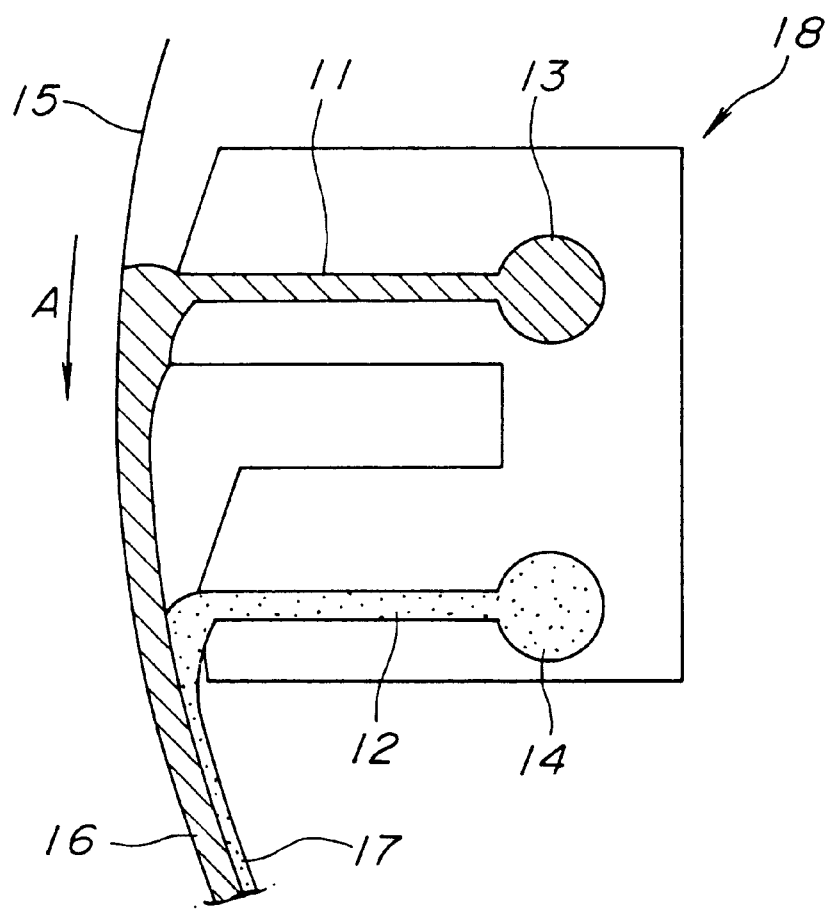
FIG. 2 is a schematic drawing showing an applicator for applying coating for lower and upper layers.

It is desirable that the wet-on-wet coating system is used of these in view of the uniformity of a coating film, the adhesion of an interface between the upper and lower layers and productivity. FIG. 2 shows an example of an applicator for applying coating according to this wet-on-wet coating system.

This applicator is provided with a die head 18 (four-lip type die head) with two slits (a slit 11 for lower coating, a slit 12 for upper coating) to the end of which coating is pushed out. That is, in this die head, a lower coating reservoir 13 and an upper coating reservoir 14 to which respectively lower coating and upper coating are supplied are formed on the back side of the two slits 11 and 12, and lower coating and upper coating which are supplied to these coating reservoirs 13 and 14 are pushed out to the end of the die head through the slits 11 and 12. In the meantime, a base material 15 on which coating is to be applied is moved from the slit 11 for lower coating toward the slit 12 for upper coating along the end of the die head in the direction shown by an arrow A in FIG. 2.

Lower coating pushed out from the slit 11 is first applied on the surface of the nonmagnetic base material 15 moved as described above when the base material passes through the slit 11 for lower coating and as a result, a lower coating film 16 is formed. When the base material passes through the slit 12 for upper coating, upper coating pushed out from this slit 12 is applied on the wet lower coating film 16 and as a result, two-layer coating films 16 and 17 are formed. These wet two-layer coating films are dried, if necessary, surface smoothing processing such as calendering is performed and a laminated coat-type magnetic recording medium is produced.

There are three-lip type and two-lip type die heads in addition to the above four-lip type die head.

As the lower and upper layers formed according to the wet-on-wet coating system as described above are formed by applying upper coating on the wet lower coating film, the surface of the lower layer, that is, the boundary face between the lower layer and upper layers is smooth. Therefore, the surface of the upper layer is also very satisfactory and is suitable for high density recording for which an dropout is not formed, and high output and low noise are requested severely. As the lower and upper layers are adhesive, the peeling of a film hardly occurs and excellent durability can be obtained.

Between the lower and upper layers formed according to the wet-on-wet coating system, a definite boundary may substantially exist and a boundary area in which components of both layers coexist in the fixed thickness may exist. In the present invention, if such a boundary area exists, a layer on the lower side of the boundary area is called the lower layer and a layer on the upper side is called the upper layer except this boundary area.

In the meantime, if the upper and lower layers are formed according to the wet-on-dry coating system, a normal coating system such as a die head coating system, a gravure roll coating system and a reverse roll coating system is adopted for a method of applying lower and upper coating. However, in this case, material for the lower layer is required to be selected so that the lower layer has sufficient resistance to a solvent in upper coating.

As the material of the lower and upper layers formed as described above is selected so that the surface of the lower nonmagnetic layer is smooth, the surface of the upper magnetic layer is also formed so that it is smooth. That is, the upper magnetic layer is formed so that the surface roughness Ra measured by a non-contact optical surface roughness meter is 4 nm or less and is smaller than the smaller surface roughness Ra of those of both surfaces of the nonmagnetic base material. Therefore, a dropout is not formed and the upper magnetic layer is suitable for high density recording for which high output and low noise are requested severely.

The conditions for evenly dispersing ferromagnetic powder in the upper magnetic layer and filling the layer with the powder and forming the lower nonmagnetic layer smoothly are shown above, however, for high density mass storage recording, it is required to regulate thickness and the characteristics of the nonmagnetic base material. The object is to thin a medium so as to increase the length of a tape which can be housed in a cassette and to obtain sufficient durability even if the medium is thinned.

First, it is desirable that the thickness of the upper magnetic layer is 0.05 to 0.2 $\mu$m, is ⅕ or less of the total thickness of the lower nonmagnetic layer and the upper magnetic layer and is 1/20 or more of the total thickness of the medium. It is desirable that the thickness of the nonmagnetic base material is 5 $\mu$m or less. Such thickness is set in view of balance in the thickness of each layer and thinning the medium itself.

That is, it is profitable to thin each layer as much as possible so as to thin the medium, however, if the lower nonmagnetic layer is thinner than in the above range, the roughness of the nonmagnetic base material cannot be masked sufficiently by the lower layer and a problem that masking effect is deteriorated occurs. If the upper magnetic layer is too thin, the electromagnetic transduction characteristic is also deteriorated. Therefore, it should be avoided to thin the upper and lower layers excessively and it is rather convenient to thin the nonmagnetic base material in place of the upper and lower layers because the total thickness of the medium can be reduced minimizing an effect upon masking effect and the electromagnetic transduction characteristic. The above thickness is set in view of t he above-described.

However, if the nonmagnetic base material is simply thinned, not only the stiffness of a tape is reduced and contact with a head is poor but a problem such as the damage of the edge of a tape, rivelling and the failure of the coiled form occurs. To avoid such a problem, Young's modulus of the nonmagnetic base material is required to be 1,000 kg/mm$^2$ or more. If its Young's modulus is 1,000 kg/mm$^2$ or more even if the nonmagnetic base material is thinner than 5 $\mu$m, sufficient practical characteristics can be secured because the strength of the upper and lower layers is added as described above in detail.

The basic constitution of the magnetic recording medium according to the present invention is described above, however, the constitution of a magnetic recording medium is not limited to this. The constitution which is generally adopted in a magnetic recording medium may be added may be added so as to improve the characteristics.

For example, an additive such as lubricant and a surface active agent may be added to the upper magnetic layer and the lower nonmagnetic layer if necessary.

For lubricant, solid lubricant such as graphite, molybdenum disulfide and tungsten disulfide, silicone oil, fatty acid with 10 to 22 carbon atoms, fatty acid ester which is synthesized based upon fatty acid with 10 to 22 carbon atoms and alcohol with 2 to 26 carbon atoms, terpenic compounds and these oligomers and fluoric lubricant can be given. Such lubricant may be added to only the upper layer and may be also added to both layers. However, it is desirable that such lubricant is added to both layers because the absolute quantity of required lubricant is insufficient if it is added to only the upper layer.

For a surface active agent, a nonionic one, an anionic one, a cationic one and an ampholytic one may be used. These surface active agents may be added to only either the upper layer or the lower layer and may be also added to both layers. If a surface active agent is added to both layers, the same type may be used and different types may be also used. For an added quantity, the same quantity may be added and different quantities may be also added.

Further, polyisocyanate which cross-links and hardens binder may be also used together. For polyisocyanate, toluene diisocyanate and its addition products, alkylene diisocyanate and its addition products may be used. For the added quantity of polyisocyanate, 5 to 80 weight to binder 100 weight is suitable and 10 to 50 weight is desirable. This polyisocyanate may be added to both layers and may be also added to only the upper layer. If polyisocyanate is added to both layers, equal quantity may be added to each layer and different quantity of arbitrary ratio may be also added to each layer.

A back coating layer 3 may be provided on the side reverse to the side on which the upper layer 2 and the lower layer 4 are formed on the nonmagnetic base material 1 to this magnetic recording medium as shown in FIG. 1 showing a magnetic tape of a computer for storing data so as to enhance running performance and to prevent electrification and transfer. An under coat may be provided between the lower layer and the nonmagnetic base material to enhance the adhesion of the lower layer and the base material. However, to achieve mass storage, the thickness of each layer is required to be set so that the total thickness of the medium is not too thick.

Embodiments

Preferred embodiments according to the present invention will be described below based upon the result of experiments.

Examination of the Length of a Major Axis of Ferromagnetic Powder Used for the Upper Layer Samples A-1, B-1, C-1, D-1, A-2, B-2, C-2, C-3, D-2 of iron ferromagnetic powder provided with composition, a magnetic characteristic, the mean length of a major axis and the standard deviation of the length of a major axis shown in Table 1 are prepared. The composition of an alloy of ferromagnetic powder is obtained by X-ray fluorescence analysis. Saturation magnetization as and coercive force Hc are measured using a magnetometer manufactured by Toei Industries. The external magnetic field when measured is 1.2 MA/m (15 kOe). The mean value L (the mean length) of a major axis and the standard deviation $\sigma$ of the length of a major axis are calculated based upon the result of 200 samples selected at random on a picture taken via a transmission type electron microscope.

Coating for the upper layer is prepared using such ferromagnetic powder according to the following composition: Coating is prepared by kneading ferromagnetic powder, binder, an additive and a solvent by a kneader so that a volatile component accounts for 85 percents by weight after the above is mixed according to a normal method and by dispersing them by a sand mill for five hours. However, $Al_2O_3$ is slurried and mixed with other compositions at the stage of dispersion.

Composition of coating for an upper layer

| | |
|---|---|
| Iron ferromagnetic powder | 100 weight |
| Vinyl chloride copolymer (Degree of polymerization: 150, Includes sodium salt sulfonate by $5 \times 10^{-5}$ mol/g as a polar functional group.) | 14 weight |
| Polyester polyurethane resin (Includes sodium salt sulfonate by $1 \times 10^{-4}$ mol/g as a polar functional group.) | 6 weight |
| Additive: carbon | 2 weight |
| $Al_2O_3$ (Primary particle size: 0.09 $\mu$m, Central particle size in slurry: 0.17 $\mu$m) | 5 weight |
| Stearic acid | 1 weight |
| Heptyl stearate | 1 weight |
| Methyl ethyl ketone | 150 weight |
| Cyclohexanone | 150 weight |

Next, coating for a lower layer is prepared by kneading nonmagnetic powder, binder and a solvent by a kneader so that a nonvolatile component accounts for 85 percents by weight after the above is mixed according to the following composition and further, by dispersing them by a sand mill for three hours.

Composition of coating for a lower layer

| | |
|---|---|
| Alpha iron oxide (Processed including Si by 3 atomic percentage. Ratio of the length of a major axis to that of a minor axis:8, Length of a major axis: 0.18 $\mu$m) | 100 weight |
| Vinyl chloride copolymer (Degree of polymerization: 150, Includes sodium salt sulfonate by $5 \times 10^{-5}$ mol/g as a polar functional group.) | 14 weight |
| Polyester polyurethane resin (Includes sodium salt sulfonate by $1 \times 10^{-4}$ mol/g as a polar functional group.) | 6 weight |
| Stearic acid | 1 weight |
| Heptyl stearate | 1 weight |
| Methyl ethyl ketone | 105 weight |
| Cyclohexanone | 105 weight |

After polyisocyanate is respectively added to the prepared upper coating and lower coating by 4 weight and 2 weight, these coats are simultaneously applied on an aramid (aromatic polyamide) film 4.5 $\mu$m thick (surface roughness Ra: 5.5 nm on the surface with satisfactory roughness, 7.0 nm on the surface with poor roughness) using a four-lip type die coater. After orientation processing is performed for the upper coating film using a solenoid coil while it is wet, the upper magnetic layer and the lower nonmagnetic layer are formed by drying, calendering and hardening. The thickness of each coating layer after it is dried is set so that the upper layer is 0.15 $\mu$m and the lower layer is 2.0 $\mu$m.

In the meantime, back coating is prepared according to the following composition:

Composition of back coating

| | |
|---|---|
| Carbon black (Trade name: Asahi No. 50) | 100 weight |
| Polyester polyurethane (Manufactuped by Nipporan. Trade name N-2304) | 100 weight |
| Methyl ethyl ketone | 500 weight |
| Toluene | 500 weight |

A back coating layer is formed by applying this back coating on the side reverse to the side of the nonmagnetic base material on which the upper and lower layers are formed so that it is 0.5 $\mu$m thick.

Original tape on which the upper and lower layers and the back coating layer are formed is slit so that each tape is 8 mm wide.

The magnetic characteristics, the surface roughness Ra, the electromagnetic transduction characteristic and C/N ratio of the magnetic tape produced as described above are measured.

For the magnetic characteristics, saturation magnetic flux density Bm, coercive force Hc and the ratio Rs of residual magnetic flux density to saturation magnetic flux density are measured by a magnetometer under a condition that an external magnetic field is 0.8 MA/m (10 kOe).

The surface roughness Ra is measured by a noncontact optical surface roughness meter (a laser interference measuring microscope manufactured by ZYGO).

The electromagnetic transduction characteristic is evaluated by measuring the output at two points of a wavelength $\lambda=0.5$ $\mu$m and a wavelength $\lambda=0.33$ $\mu$m using measurement equipment into which Hi-8 deck manufactured by Sony Corporation is remodeled. C/N ratio is evaluated by measuring the level of noise 1 MHz off central frequency. The output and C/N ratio are based upon a value in Experiment 5 specified as 0 dB.

Table 1 shows the result of the above measurement together with the characteristics of ferromagnetic powder used for the upper magnetic layer.

TABLE 1

| Sample name | pHc (kA/m) | δs (Am²/kg) | Mean length of major axis L (μm) | Standard deviation (μm) | Relational expression (Note) |
|---|---|---|---|---|---|
| Experiment 1 | A-1 | 130 | 122 | 0.240 | 0.044 | Within a range |
| Experiment 2 | B-1 | 139 | 125 | 0.192 | 0.023 | Within a range |
| Experiment 3 | C-1 | 172 | 141 | 0.086 | 0.013 | Within a range |
| Experiment 4 | D-1 | 169 | 135 | 0.063 | 0.008 | Within a range |
| Experiment 5 | A-2 | 132 | 123 | 0.255 | 0.056 | Beyond a range |
| Experiment 6 | B-2 | 139 | 126 | 0.193 | 0.070 | Beyond a range |
| Experiment 7 | C-2 | 146 | 136 | 0.088 | 0.042 | Beyond a range |
| Experiment 8 | C-3 | 170 | 140 | 0.086 | 0.025 | Beyond a range |
| Experiment 9 | D-2 | 159 | 133 | 0.065 | 0.030 | Beyond a range |

(Note) Relational expression: $0.01 \mu m < L \pm 2\delta < 0.33 \mu m$

| | Composition of alloy | tHc (kA/m) | Bm (mT) | Rs | Ra (nm) | Output (dB) | C/N (dB) |
|---|---|---|---|---|---|---|---|
| Experiment 1 | Fe | 135 | 305 | 0.85 | 3.0 | +0.8 | +1.0 |
| Experiment 2 | Fe—Co | 141 | 322 | 0.87 | 2.8 | +3.3 | +2.8 |
| Experiment 3 | Fe—Co | 175 | 441 | 0.86 | 2.5 | +6.0 | +4.5 |
| Experiment 4 | Fe—Co | 170 | 410 | 0.84 | 2.4 | +6.2 | +4.9 |
| Experiment 5 | Fe | 137 | 305 | 0.84 | 3.2 | 0 | 0 |
| Experiment 6 | Fe—Co | 142 | 323 | 0.87 | 3.0 | +0.5 | +0.1 |
| Experiment 7 | Fe | 144 | 351 | 0.84 | 3.2 | +2.5 | +2.0 |
| Experiment 8 | Fe—Co | 171 | 436 | 0.81 | 3.3 | +3.7 | +2.7 |
| Experiment 9 | Fe—Co | 159 | 402 | 0.77 | 3.4 | +3.3 | +3.1 |

In the respective combinations of Experiments 1 and 5, Experiments 2 and 6, Experiments 3, 7 and 8 and Experiments 4 and 9, the mean length L of a major axis of ferromagnetic powder used for the upper magnetic layer is substantially equal. However, the standard deviation σ is larger in Experiments 5 to 9 than in Experiments 1 to 4 and the result of Experiments 5 to 9 does not meet an expression "$0.01 \mu m < L \pm 2\sigma < 0.33 \mu m$.

When comparison is made in these combinations, the output and C/N ratio of magnetic tapes used in Experiments 5 to 9 are lower than those of magnetic tapes used in Experiments 1 to 4. However, for magnetic characteristic and surface roughness Ra, there is no extreme difference between their combinations. Hereby, the deterioration of the characteristics of magnetic tapes used in Experiments 5 to 9 are conceived to be caused by the deterioration of the particle size distribution of ferromagnetic powder, that is, the increase of particle length loss by the increase of the number of maximum particles.

That is, to obtain a magnetic tape which is excellent in an electromagnetic transduction characteristic, the particle size distribution of ferromagnetic powder for the upper magnetic layer is important and the result of experiments tells it is desirable that ferromagnetic powder which meets the expression "$0.01 \mu m < L \pm 2\sigma < 0.33 \mu m$ is used.

When comparison is made in Experiments 1 to 4 in which ferromagnetic powder meets the expression "$0.01 \mu m < L \pm 2\sigma < 0.33 \mu m$", output and C/N ratio are increased as the mean length of a major axis of ferromagnetic powder is smaller, however, when this mean length of a major axis is very small, the increase of output is reduced as shown in Experiments 3 and 4. It is because when ferromagnetic powder is too minute, such a particulate exceeds the dispersion power of binder and a disperser and the powder is not dispersed sufficiently.

Examination of the Content of a Polar Group Included in a Vinyl Chloride Copolymer Used for the Upper Layer A magnetic tape is produced by the same method as in Experiment 3 except that a vinyl chloride copolymer used for the upper magnetic layer the degree of polymerization of which is 150 and which includes sodium salt sulfonate of a quantity shown in Table 2 is used.

The magnetic characteristic, the surface roughness Ra, the electromagnetic transduction characteristic and C/N ratio of the produced magnetic tape are measured. Table 2 shows the result of measurement together with the content of sodium salt sulfonate included in the vinyl chloride copolymer.

TABLE 2

| | Quantity of —SO₃Na (mol/g) | tHc (kA/m) | Bm (mT) | Rs | Ra (nm) | Output (dB) | C/N (dB) |
|---|---|---|---|---|---|---|---|
| Experiment 10 | $1 \times 10^{-5}$ | 169 | 413 | 0.81 | 3.2 | +4.1 | +3.1 |
| Experiment 11 | $5 \times 10^{-5}$ | 175 | 441 | 0.86 | 2.5 | +6.0 | +4,5 |
| Experiment 12 | $1 \times 10^{-4}$ | 173 | 440 | 0.85 | 2.8 | +5.7 | +4.4 |
| Experiment 13 | 0 | 160 | 385 | 0.74 | 7.2 | +2.5 | +1.3 |

As shown in Table 2, a satisfactory electromagnetic transduction characteristic is obtained in Experiments 10 to 12 using a vinyl chloride copolymer including sodium salt sulfonate for the upper magnetic layer, compared with those in Experiment 13 using a vinyl chloride copolymer which does not include sodium salt sulfonate. This result tells the electromagnetic transduction characteristic of a magnetic tape is improved by including a polar group such as sodium salt sulfonate in the vinyl chloride copolymer used for the upper magnetic layer.

Examination of the Type of a Polar Group Included in a Vinyl Chloride Sulfonate Used for the Upper Layer A magnetic tape is produced by the same method as in Experiment 3 except that a vinyl chloride copolymer used for the upper magnetic layer the degree of polymerization of which is 150 and which includes a polar functional group of $5 \times 10^{-5}$ mol/g shown in Table 2 is used.

The magnetic characteristic, the surface roughness Ra, the electromagnetic transduction characteristic and C/N ratio of the produced magnetic tape are measured. Table 3 shows the result of measurement together with the type of a polar functional group doped in the vinyl chloride copolymer.

TABLE 3

|  | Type of polar group | tHc (kA/m) | Bm (mT) | Rs | Ra (nm) | Output (dB) | C/N (dB) |
|---|---|---|---|---|---|---|---|
| Experiment 14 | Potassium salt sulfonate | 170 | 422 | 0.83 | 2.9 | +4.7 | +3.6 |
| Experiment 15 | Carboxylic acid | 155 | 302 | 0.80 | 4.4 | +3.0 | +1.5 |
| Experiment 16 | Tertiary amine | 158 | 393 | 0.79 | 4.8 | +2.7 | +1.3 |
| Experiment 17 | Quaternary ammonium salt | 160 | 388 | 0.75 | 6.7 | +1.5 | +1.0 |

As shown in Table 3, for a magnetic tape produced in Experiment 14 using a vinyl chloride copolymer including potassium salt sulfonate and a magnetic tape produced in Experiment 3 using a vinyl chloride copolymer including sodium salt sulfonate, substantially equal characteristics are obtained. However, if a vinyl chloride copolymer including carboxylic acid and tertiary amine or quaternary ammonium salt is used, the characteristics are deteriorated, compared with those of the magnetic tapes produced in Experiments 3 and 14. This tells metallic salt sulfonate is the most suitable as a polar functional group doped in the vinyl chloride copolymer used for the upper layer.

Examination of the Degree of Polymerization of a Vinyl Chloride Copolymer Used for the Upper Layer A magnetic tape is produced by the same method as in Experiment 3 except that a vinyl chloride copolymer used for the upper magnetic layer which includes sodium salt sulfonate of $5 \times 10^{-5}$ mol/g and is provided with the degree of polymerization shown in Table 4 is used.

The magnetic characteristic, the surface roughness Ra, the electromagnetic transduction characteristic and C/N ratio of the produced magnetic tape are measured, and the durability in a still state, the durability in a shuttle and the number of dropouts are measured.

Durability in a still state is evaluated by measuring time in which output is attenuated to −3 dB in a pause. Durability in a shuttle is evaluated by shuttling the tape for two minutes per once and measuring time in which output is attenuated to 3 dB. Such durability is measured under normal temperature of 25° C. and normal relative humidity of 60%.

The number of dropouts is evaluated by measuring the frequency of the deterioration 10 dB or more continuing for 3 μsec. in three minutes of output.

Table 4 shows the result of measurement together with the degree of polymerization of the vinyl chloride copolymer.

TABLE 4

|  | Polymerization degree | tHc (kA/m) | Bm (mT) | Rs | Ra (nm) |
|---|---|---|---|---|---|
| Experiment 18 | 150 | 175 | 441 | 0.86 | 2.5 |
| Experiment 19 | 100 | 176 | 444 | 0.87 | 2.4 |
| Experiment 20 | 180 | 175 | 440 | 0.85 | 3.0 |
| Experiment 21 | 300 | 158 | 427 | 0.81 | 4.6 |

TABLE 4-continued

|  | Output (dB) | C/N (dB) | Durability in still state (min.) | Durability in shuttle (times) | Number of dropouts (piece) |
|---|---|---|---|---|---|
| Experiment 18 | +6.0 | +4.5 | >120 | >150 | 33 |
| Experiment 19 | +6.0 | +4.6 | 106 | 95 | 65 |
| Experiment 20 | +5.8 | +4.3 | >120 | >150 | 38 |
| Experiment 21 | +4.5 | +3.2 | >120 | >150 | 27 |

As shown in Table 4, as the degree of polymerization of resin is reduced in a range in which the degree of polymerization of a vinyl chloride copolymer used for the upper layer is 180 or less (Experiments 18 to 20), durability in a still state and durability in a shuttle are a little deteriorated, however, durability and an electromagnetic transduction characteristic are in the tolerance. However, when the degree of polymerization of This tells the degree of polymerization of the vinyl chloride copolymer used for the upper layer of 180 or less is suitable.

Examination of the Compounding Ratio of a Vinyl Chloride Copolymer and Polyester Polyurethane Resin in the Upper Layer A magnetic tape is produced by the same method as in Experiment 3 except that the compounding ratio of a vinyl chloride copolymer and polyester polyurethane resin used in the upper magnetic layer is changed as shown in Table 5.

The magnetic characteristic, the surface roughness Ra, the electromagnetic transduction characteristic and C/N ratio of the produced magnetic tape are measured, and the durability in a still state, the durability in a shuttle and the number of dropouts are measured. Table 5 shows the result of measurement together with the compounding ratio of binder.

TABLE 5

|  | Vinyyl chloride resin (weight) | Polyurethane resin (weight) | tHc (kA/m) | Bm (mT) | Rs |
|---|---|---|---|---|---|
| Experiment 22 | 20 | 0 | 177 | 441 | 0.87 |
| Experiment 23 | 14 | 6 | 175 | 441 | 0.86 |
| Experiment 24 | 10 | 10 | 176 | 440 | 0.86 |
| Experiment 25 | 6 | 14 | 175 | 440 | 0.86 |
| Experiment 26 | 0 | 20 | 175 | 439 | 0.85 |

|  | Ra (nm) | Output (dB) | C/N (dB) | Durability in still state (min.) | Durability in shuttle (times) | Number of dropouts (piece) |
|---|---|---|---|---|---|---|
| Experiment 22 | 2.4 | +6.1 | +4.6 | >120 | >120 | 34 |
| Experiment 23 | 2.5 | +6.0 | +4.5 | >120 | >150 | 33 |
| Experiment 24 | 2.5 | +6.0 | +4.4 | >120 | >120 | 39 |
| Experiment 25 | 2.5 | +6.0 | +4.3 | >120 | >120 | 75 |
| Experiment 26 | 2.6 | +5.9 | +4.2 | >120 | >120 | 110 |

As shown in Table 5, if the compounding ratio of a vinyl chloride copolymer in binder in the upper layer is reduced, output, C/N ratio, characteristics in a still state, characteristics in a shuttle are almost unchanged. However, the number of dropouts is remarkably increased particularly in Experiments 25 and 26 in which the compounding ratio of a vinyl chloride copolymer is set to 6 weight or 0 weight. As the compounding ratio of polyurethane resin is large in Experiments 25 and 26, affinity between the upper and lower layers is deteriorated and the unevenness of coating is found in laminated coats.

This tells the compounding ratio of the vinyl chloride copolymer in binder used for the upper layer is required to be 50 percents by weight or more of the total quantity of binder.

Examination of the Compounding Ratio of a Vinyl Chloride Copolymer the Degree of Polymerization of which is 150 and a Vinyl Chloride Copolymer the Degree of Polymerization is 300 in the upper Layer A magnetic tape is produced by the same method as in Experiment 3 except that for binder used in the upper magnetic layer, mixture in which a vinyl chloride copolymer the degree of polymerization of which is 150 and which includes sodium salt sulfonate of $5 \times 10^{-5}$ mol/g as a polar functional group and a vinyl chloride copolymer the degree of polymerization of which is 300 and which includes sodium salt sulfonate of $5 \times 10^{-5}$ mol/g as a polar functional group are mixed according to a compounding ratio shown in Table 6 is used in place of the mixture of a vinyl chloride copolymer and polyester polyurethane resin.

The magnetic characteristic, the surface roughness Ra, the electromagnetic transduction characteristic and C/N ratio of the produced magnetic tape are measured, and the durability in a still state, the durability in a shuttle and the number of dropouts are measured. Table 6 shows the result of measurement together with the compounding ratio of binder.

TABLE 6

|  | Polymerization degree 150 of polyviyl chloride (weight) | Polymerization degree 300 of polyvinyl chloride (weight) | tHc (kA/m) | Bm (mT) | Rs |
|---|---|---|---|---|---|
| Experiment 27 | 20 | 0 | 177 | 441 | 0.87 |
| Experiment 28 | 14 | 6 | 176 | 440 | 0.86 |
| Experiment 29 | 10 | 10 | 175 | 439 | 0.85 |
| Experiment 30 | 6 | 14 | 174 | 431 | 0.83 |
| Experiment 31 | 0 | 20 | 172 | 422 | 0.80 |

|  | Ra (nm) | Output (dB) | C/N (dB) | Durability in still state (min.) | Durability in shuttle (times) | Number of dropouts (piece) |
|---|---|---|---|---|---|---|
| Experiment 27 | 2.4 | +6.1 | +4.6 | >120 | >150 | 34 |
| Experiment 28 | 2.7 | +5.9 | +4.4 | >120 | >150 | 32 |
| Experiment 29 | 3.0 | +5.8 | +4.2 | >120 | >150 | 31 |
| Experiment 30 | 3.0 | +5.2 | +3.8 | >120 | >150 | 29 |
| Experiment 31 | 4.7 | +4.2 | +3.0 | >120 | >150 | 25 |

As shown in Table 6, if the compounding ratio of a vinyl chloride copolymer the degree of polymerization of which is 150 is reduced, durability such as characteristics in a still state, characteristics in a shuttle and the number of dropouts is almost unchanged. However, an electromagnetic transduction characteristic is remarkably deteriorated particularly in Experiment 31 in which the compounding ratio of a vinyl chloride copolymer the degree of polymerization is 150 is 6 percents by weight or 0 percent by weight.

This tells that if vinyl chloride copolymers the degree of polymerization of which is respectively different are combined, the compounding ratio of resin the degree of polymerization of which is suitable, that is, a vinyl chloride copolymer the degree of polymerization of which is 180 or less is also required to be 50 percents by weight or more of the total binder.

The characteristics of a magnetic tape using mixture in which a vinyl chloride copolymer the degree of polymerization of which is 150, a vinyl chloride copolymer the degree of polymerization of which is 300 and polyurethane resin are mixed according to the compounding ratio of "10 weight to 5 weight to 5 weight" are also evaluated similarly. As a result, satisfactory values that its coercive force tHc is 175 kA/m, saturation magnetic flux density Bm is 440 mT, the ratio Rs of residual magnetic flux density to saturation magnetic flux density is 0.86, the surface roughness Ra is 2.6 nm, output is +5.9 dB, C/N ratio is +4.4 dB, durability in a still is 120 minutes or longer, durability in a shuttle is 150 times or more and the number of dropouts is 36 are obtained. This tells that if three types of binders are used together, the compounding ratio of the vinyl chloride copolymer the degree of polymerization is suitable is also required to be 50 percents by weight or more of the total binder.

Examination of the Quantity of a Nonvolatile Component in Kneading Upper Coating A magnetic tape is produced by the same method as in Experiment 3 or 22 except that the quantity of a nonvolatile component in kneading coating for the upper layer is changed as shown in Tables 7 and 8.

The magnetic characteristic, the surface roughness Ra, the electromagnetic transduction characteristic, C/N ratio and the number of dropouts of the produced magnetic tape are measured. Tables 7 and 8 show the result of measurement together with the quantity of a nonvolatile component in kneading coating for the upper layer. Table 7 shows the result of measurement of the magnetic tape produced according to Experiment 22 and Table 8 shows the result of measurement of the magnetic tape produced according to Experiment 3.

TABLE 7

|  | Solid in kneading (%) | tHc (kA/m) | Bm (mT) | Rs | Ra (nm) | Output (dB) | C/N (dB) | Number of dropouts (piece) |
|---|---|---|---|---|---|---|---|---|
| Experiment 32 | 75 | 172 | 403 | 0.83 | 5.9 | +4.5 | +3.0 | 98 |
| Experiment 33 | 80 | 175 | 438 | 0.85 | 3.3 | +5.7 | +4.1 | 42 |
| Experiment 34 | 85 | 177 | 441 | 0.87 | 2.4 | +6.1 | +4.6 | 34 |
| Experiment 35 | 90 | 176 | 442 | 0.85 | 3.4 | +5.6 | +4.0 | 45 |
| Experiment 36 | 93 | 174 | 430 | 0.81 | 5.9 | +4.1 | +2.2 | 160 |

TABLE 8

| | Solid in kneading (%) | tHc (kA/m) | Bm (mT) | Rs | Rs (nm) | Output (dB) | C/N (dB) | Number of outputs (piece) |
|---|---|---|---|---|---|---|---|---|
| Experiment 37 | 75 | 171 | 399 | 0.79 | 7.2 | +3.6 | +2.0 | 181 |
| Experiment 38 | 80 | 174 | 433 | 0.84 | 3.3 | +5.7 | +4.0 | 40 |
| Experiment 39 | 85 | 175 | 441 | 0.86 | 2.5 | +6.0 | +4.5 | 33 |
| Experiment 40 | 90 | 176 | 442 | 0.86 | 2.8 | +5.9 | +4.1 | 39 |
| Experiment 41 | 93 | 175 | 430 | 0.83 | 4.3 | +4.4 | +2.6 | 87 |

Table 7 shows a case that for binder, only a vinyl chloride copolymer the degree of polymerization of which is 150 is used and Table 8 shows a case that the mixture of a vinyl chloride copolymer the degree of polymerization of which is 150 and polyurethane resin is used, however, Tables 7 and 8 show in both cases, an electromagnetic transduction characteristic and a dropout characteristic are improved by setting the quantity of a nonvolatile component in kneading coating for the upper layer to 80 to 90 percents by weight.

In Experiment 32, the dispersibility of coating is low and the unevenness of coating is found when upper coating and lower coating are simultaneously applied. In Experiment 37, the effect of kneading is hardly produced because the quantity of solid material in kneading is too low.

Examination of Particle Size of Abrasive Powder Used for the Upper Layer

A magnetic tape is produced by the same method as in Experiment 3 except that for $Al_2O_3$ used for the upper magnetic layer, abrasive powder the primary particle size and the central particle size in a slurry of which are shown in Table 9 is used. However, in Experiments 45 and 49, $Al_2O_3$ is added as powder in a kneading process. The central particle size of $Al_2O_3$ in a slurry is controlled by varying the time of dispersion.

The magnetic characteristic, the surface roughness Ra, the electromagnetic transduction characteristic, C/N ratio, the durability in a still state, the durability in a shuttle and the number of dropouts of the produced magnetic tape are measured. Table 9 shows the result of measurement together with the primary particle size and the central particle size in a slurry of $Al_2O_3$.

TABLE 9

| | Primary particle size (μm) | Method of addition | Central particle size (μm) | Surface roughness Ra (nm) | Output (dB) | C/N (dB) | Durability in still state (min.) | Durability in shuttle (times) | Dropouts (times) |
|---|---|---|---|---|---|---|---|---|---|
| Experiment 42 | 0.05 | In slurry | 0.10 | 2.2 | +6.2 | +4.6 | 110 | 148 | 68 |
| Experiment 43 | 0.05 | In slurry | 0.17 | 2.5 | +6.0 | +4.5 | >120 | >150 | 43 |
| Experiment 44 | 0.05 | In slurry | 0.25 | 3.8 | +5.6 | +4.1 | >120 | >150 | 70 |
| Experiment 45 | 0.05 | Powder | — | 4.7 | +5.1 | +3.7 | 85 | 102 | 160 |
| Experiment 46 | 0.09 | In slurry | 0.14 | 2.3 | +6.1 | +4.5 | >120 | 140 | 48 |
| Experiment 47 | 0.09 | In slurry | 0.17 | 2.5 | +6.0 | +4.5 | >120 | >150 | 33 |
| Experiment 48 | 0.09 | In slurry | 0.29 | 3.9 | +5.5 | +4.0 | >120 | >150 | 59 |
| Experiment 49 | 0.09 | Powder | — | 5.9 | +4.8 | +3.3 | 105 | 133 | 93 |
| Experiment 50 | 0.15 | In slurry | 0.35 | 4.2 | +5.3 | +3.9 | >120 | >120 | 68 |

As shown in Table 9, in Experiments 45 and 49 in which $Al_2O_3$ is added as powder in kneading, not only a surface condition is deteriorated, but dropouts are also increased. In the meantime, if $Al_2O_3$ is slurried, $Al_2O_3$ is dispersed in the magnetic layer and a magnetic tape which is excellent in a surface condition and electromagnetic transduction characteristics can be obtained. Particularly if $Al_2O_3$ is dispersed in a slurry until its central particle size is 0.17 μm or less, a magnetic tape which is very excellent in an electromagnetic transduction characteristic and durability can be realized.

Examination of the Layer Thickness of a Magnetic Tape

A magnetic tape is produced by the same method as in Experiment 3 except that the thickness of the upper and lower layers, a base film and a back coating layer is changed as shown in Table 10.

The electromagnetic transduction characteristic, C/N ratio and an overwrite characteristic of the produced magnetic tape are measured.

The overwrite characteristic is evaluated by measuring the output of an original signal remaining after the signal with a wavelength of 4 μm is erased by a signal with a wavelength of 1 μm. For output, the value in Experiment 3 is specified as 0 dB.

Table 10 shows the result of measurement together with the constitution of the thickness of layers.

TABLE 10

| | Thickness of upper layer (μm) | Thickness of lower layer (μm) | Thickness of base (μm) | Thickness of back layer (μm) |
|---|---|---|---|---|
| Experiment 51 | 0.1 | 1.0 | 5.0 | 0.5 |
| Experiment 52 | 0.2 | 1.0 | 5.0 | 0.5 |
| Experiment 53 | 0.3 | 1.0 | 5.0 | 0.5 |
| Experiment 54 | 0.5 | 1.0 | 5.0 | 0.5 |
| Experiment 55 | 0.1 | 2.0 | 5.0 | 0.5 |
| Experiment 56 | 0.15 | 2.0 | 5.0 | 0.5 |
| Experiment 57 | 0.2 | 2.0 | 5.0 | 0.5 |
| Experiment 58 | 0.3 | 2.0 | 5.0 | 0.5 |
| Experiment 59 | 0.5 | 2.0 | 5.0 | 0.5 |
| Experiment 60 | 0.1 | 1.0 | 5.5 | 0.5 |
| Experiment 61 | 0.3 | 1.0 | 5.5 | 0.5 |

TABLE 10-continued

| | | | | |
|---|---|---|---|---|
| Experiment 62 | 0.5 | 1.0 | 5.5 | 0.5 |
| Experiment 63 | 0.1 | 2.0 | 5.5 | 0.5 |
| Experiment 64 | 0.3 | 2.0 | 5.5 | 0.5 |
| Experiment 65 | 0.5 | 2.0 | 5.5 | 0.5 |

| | Condition (1) | Condition (2) | Output (dB) | C/N (dB) | Overwrite (dB) |
|---|---|---|---|---|---|
| Experiment 51 | O | O | +6.0 | +4.3 | +2.9 |
| Experiment 52 | O | O | +5.5 | +4.1 | −2.0 |
| Experiment 53 | X | O | +5.3 | +3.9 | −3.5 |
| Experiment 54 | X | X | +4.6 | +3.3 | −4.1 |
| Experiment 55 | O | O | +6.4 | +4.6 | +3.0 |
| Experiment 56 | O | O | +6.0 | +4.5 | 0 |
| Experiment 57 | O | O | +5.8 | +4.4 | −1.8 |
| Experiment 58 | O | O | +5.5 | +4.2 | −3.3 |
| Experiment 59 | O | X | +5.0 | +3.5 | −4.0 |
| Experiment 60 | O | O | +6.1 | +4.3 | +2.8 |
| Experiment 61 | X | O | +5.3 | +3.9 | −3.5 |
| Experiment 62 | X | X | +4.6 | +3.3 | −4.1 |
| Experiment 63 | O | O | +6.4 | +4.6 | +3.0 |
| Experiment 64 | O | O | +5.6 | +4.2 | −3.4 |
| Experiment 65 | O | X | +5.0 | +3.5 | −4.1 |

(Note)
Condition (1): The thickness of upper layer is 1/5 or less of thickness of total coated layers.
Condition (2): The thickness of upper layer is 1/20 or less of total thickness of tape.
"O" shows the condition is met.
"X" shows the condition is not met.

As shown in Table 10, for a magnetic tape which meets a condition that the thickness of the upper layer is 0.2 μm or less, is 1/5 or less of the total thickness of the upper and lower layers and is 1/20 or less of the total thickness of the tape, output of 5.5 dB or more can be obtained and such a magnetic tape is also excellent in an overwrite characteristic. Although the thickness of a base film has no effect upon output and an overwrite characteristic, it is desirable that it is 5 μm or less to thin a tape.

Examination of Coating Nonmagnetic Powder Used for the Lower Layer

A magnetic tape is produced by the same method as in Experiment 3 except that for nonmagnetic powder for the lower nonmagnetic layer, hematite (alpha iron oxide) which is coated with Si and Al of quantity shown in Table 11 is used.

A method of coating hematite with Si and Al is as follows:

After hematite (hematite which is used in Experiment 1 and is not coated with Si yet) is sufficiently dispersed in water, solution of soluble salt including Si and Al of quantity corresponding to target coated quantity is added into liquid in which hematite is dispersed in an alkaline ambient atmosphere and is stirred. As a result, hematite is evenly coated with Si and Al. Hematite coated with Si and Al is pelletized after decantation, is dried until its quantity of moisture is 1% or less and is pulverized.

The surface roughness Ra when the lower layer is formed by only one layer and when two layers are formed as the lower layer and the electromagnetic transduction characteristic of the produced magnetic tape are measured. A sample chip on which a nonmagnetic layer is formed by applying and drying only coating for the lower layer is prepared and the surface roughness Ra when the lower layer is formed by only one layer is measured by measuring that of this sample.

Table 11 shows the result of measurement together with the quantity of Si and Al which is applied on hematite.

TABLE 11

| | Quantity of Si (at %) | Quantity of Al (at %) | Surface roughness of single layer (nm) | Surface roughness case of two layers (nm) | Output in (dB) |
|---|---|---|---|---|---|
| Experiment 66 | 0.5 | 0 | 3.2 | 3.4 | +5.6 |
| Experiment 67 | 3 | 0 | 2.4 | 2.5 | +6.0 |
| Experiment 68 | 10 | 0 | 3.0 | 3.1 | +5.7 |
| Experiment 69 | 0 | 0.5 | 3.3 | 3.6 | +5.5 |
| Experiment 70 | 0 | 3 | 2.6 | 2.7 | +5.B |
| Experiment 71 | 0 | 10 | 3.2 | 3.4 | +5.4 |
| Experiment 72 | 1.5 | 1.5 | 2.5 | 2.6 | +5.8 |
| Experiment 73 | 2 | 8 | 3.3 | 3.5 | +5.6 |
| Experiment 74 | 5 | 5 | 3.3 | 3.5 | +5.6 |
| Experiment 75 | 8 | 2 | 3.2 | 3.4 | +5.6 |
| Experiment 76 | 0 | 0 | 6.5 | 7.0 | +3.1 |
| Experiment 77 | 20 | 0 | 5.6 | 5.7 | +3.8 |
| Experiment 78 | 0 | 20 | 5.8 | 6.1 | +3.6 |

As shown in Table 11, if hematite which is coated with a silicon compound and an aluminum compound is used for nonmagnetic powder for the lower nonmagnetic layer and Si/Fe and Al/Fe or Si+Al/Fe of hematite are in the range of 0.5 to 10 atomic percents, the surface condition of the lower nonmagnetic layer is satisfactory and in addition, the surface condition of the upper magnetic layer is also satisfactory. Far higher output can be obtained from a magnetic tape the upper magnetic layer of which is provided with this satisfactory surface condition than from a magnetic tape using hematite which is not coated with Si and Al.

It is because the shape of powder which is made huge has a great effect on the surface that when the quantity of Si and Al which is applied on hematite exceeds 10 atomic percents, the surface condition of the lower nonmagnetic layer is deteriorated.

Examination of the Shape of Nonmagnetic Powder Used for the Lower Layer

A magnetic tape is produced by the same method as in Experiment 2 or 3 except that for nonmagnetic powder used for the lower nonmagnetic layer, nonmagnetic powder with the length of a major axis and a ratio of the length of a major axis to that of a minor axis shown in Table 12 is used.

The surface roughness Ra when the lower layer is formed by only one layer and when two layers are formed as the lower layer and the electromagnetic transduction characteristic of the produced magnetic tape are measured. Tables 12 and 13 show the result of measurement together with the length of a major axis and the ratio of length of a major axis to that of a minor axis of nonmagnetic powder for the lower layer. Table 12 shows the result of measurement of a magnetic tape produced according to Experiment 2 and Table 13 shows the result of measurement of a magnetic tape produced according to Experiment 3.

TABLE 12

| Sample name | | Length of major axis ($\mu$m) | Ratio of length of major to minor axis | Surface roughness of single layer (nm) | Surface roughness in case of two layers (nm) | Output (dB) |
|---|---|---|---|---|---|---|
| Experiment 79 | (a) | 0.10 | 3.1 | 2.4 | 3.6 | +2.7 |
| Experiment 80 | (b) | 0.11 | 5.0 | 2.4 | 2.6 | +3.4 |
| Experiment 81 | (c) | 0.17 | 1.1 | 2.7 | 5.1 | +1.9 |
| Experiment 82 | (d) | 0.18 | 3.2 | 2.5 | 4.0 | +2.5 |
| Experiment 83 | (e) | 0.17 | 4.9 | 2.6 | 2.9 | +3.2 |
| Experiment 84 | (f) | 0.18 | 8.0 | 2.4 | 2.8 | +3.3 |
| Experiment 85 | (g) | 0.20 | 5.1 | 2.8 | 3.1 | +3.0 |
| Experiment 86 | (h) | 0.31 | 5.2 | 3.1 | 3.4 | +2.7 |
| Experiment 87 | (i) | 0.49 | 7.9 | 4.4 | 4.7 | +2.1 |
| Experiment 99 | (j) | 0.51 | 10.2 | 5.0 | 5.2 | +1.8 |

TABLE 13

| Sample name | | Length of major axis ($\mu$m) | Ratio of length of major to minor axis | Surface roughness of single layer (nm) | Surface roughness in case of two layers (nm) | Output (dB) |
|---|---|---|---|---|---|---|
| Experiment 89 | (a) | 0.10 | 3.1 | 2.3 | 3.4 | +5.2 |
| Experiment 90 | (b) | 0.11 | 5.0 | 2.3 | 2.5 | +6.0 |
| Experiment 91 | (c) | 0.17 | 1.1 | 2.4 | 4.7 | +4.6 |
| Experiment 92 | (d) | 0.18 | 3.2 | 2.3 | 3.1 | +5.3 |
| Experiment 93 | (e) | 0.17 | 4.9 | 2.4 | 2.6 | +5.9 |
| Experiment 94 | (f) | 0.18 | 8.0 | 2.4 | 2.5 | +6.0 |
| Experiment 95 | (g) | 0.20 | 5.1 | 2.6 | 2.8 | +5.8 |
| Experiment 96 | (h) | 0.31 | 5.2 | 3.1 | 3.3 | +5.1 |
| Experiment 97 | (i) | 0.49 | 7.9 | 4.4 | 4.7 | +4.5 |
| Experiment 98 | (j) | 0.51 | 10.2 | 5.0 | 5.3 | +4.0 |

Tables 12 and 13 tell that if experiments using hematite substantially equal in the ratio of the length of a major axis to that of a minor axis as nonmagnetic powder (for example, Experiments 80, 83, 85, 86 or Experiments 90, 93, 95, 96) are compared, the shorter the length of a major axis of nonmagnetic powder is, the more satisfactory the surface condition of the lower nonmagnetic layer is and particularly if the length of a major axis is shorter than 0.2 $\mu$m, an extremely satisfactory surface condition can be realized.

In the meantime, for the surface condition of the upper magnetic layer, it is important to match the ratio of the length of a major axis to that of a minor axis of pigment powder used for the lower layer and pigment powder used for the upper layer in addition to the length of a major axis. Unless pigment for the lower layer (that is, hematite) with the larger ratio is used for the lower layer than the ratio of pigment for the upper layer (that is, metallic powder), it is difficult to obtain the smooth surface of the upper layer. This reason is not solved perfectly, however, it can be presumed as follows:

That is, if the above ratio of hematite for the lower layer is smaller than that of metallic powder for the upper layer, the stability of metallic powder for the upper layer on an interface between the upper and lower layers is deteriorated. Therefore, it is presumed that the fluctuation of coating is caused and as a result, surface roughness is deteriorated.

As described above, the surface condition and the electromagnetic transduction characteristic of a magnetic tape are improved by using hematite the length of a major axis of which is shorter than 0.2 $\mu$m and the above ratio of which is larger than that of ferromagnetic powder used for the upper magnetic layer for nonmagnetic powder used for the lower nonmagnetic layer.

Examination of a Vinyl Chloride Copolymer Used for the Lower Layer

A magnetic tape is produced by the same method as in Experiment 3 except that a vinyl chloride copolymer the degree of polymerization of which is the one shown in Table 14 and which includes a polar functional group of the type and the quantity shown in Table 14 is singly used for binder for the lower nonmagnetic layer.

The surface roughness Ra when the lower layer is formed by only one layer and when two layers are formed as the lower layer and the electromagnetic transduction characteristic of the produced magnetic tape are measured. Table 14 shows the result of measurement together with the polymerization degree of the vinyl chloride copolymer used for the lower nonmagnetic layer and the type and the quantity of a polar group.

TABLE 14

| | Polymerization degree | Type of polar group | Quantity of polar group (mol/g) | Surface roughness of single layer (nm) | Surface roughness in case of two layers (nm) | Output (dB) |
|---|---|---|---|---|---|---|
| Experiment 99 | 150 | Sodium salt sulfonate | $5 \times 10^{-5}$ | 2.4 | 2.6 | +5.9 |
| Experiment 100 | 150 | Sodiumn sulfonate | $1 \times 10^{-5}$ | 2.8 | 3.0 | +5.8 |
| Experiment 101 | 150 | Potassium salt sulfonate | $5 \times 10^{-5}$ | 2.8 | 3.2 | +5.7 |
| Experiment 102 | 150 | Carboxylic acid | $5 \times 10^{-5}$ | 4.8 | 5.3 | +4.2 |
| Experiment 103 | 150 | Tertiary amine | $5 \times 10^{-5}$ | 5.3 | 5.5 | +4.0 |
| Experiment 104 | 150 | Quaternary ammonium salt | $5 \times 10^{-5}$ | 5.4 | 5.1 | +3.7 |
| Experiment 105 | 180 | Sodium sulfonate | $5 \times 10^{-5}$ | 2.5 | 2.7 | +5.9 |
| Experiment 106 | 300 | Sodiumn salt sulfonate | $5 \times 10^{-5}$ | 4.0 | 4.4 | +4.7 |

As shown in Table 14, if a vinyl chloride copolymer including a polar group except metallic salt sulfonate is used for binder for the lower layer (Experiments 101 to 104), the surface roughness of the surface of the lower layer consisting of only one layer or the two layers as the lower layer is high. If a vinyl chloride copolymer the degree of polymerization of which is large is used as in Experiment 106, dispersibility in the lower layer is deteriorated and also in this case, the surface roughness of the surface of the lower layer consisting of only one layer or the two layers is high.

This tells that for binder for the lower layer, the vinyl chloride copolymer the degree of polymerization of which is 180 or less and which includes metallic salt sulfonate as a polar group is suitable.

Examination of the Compounding Ratio of a Vinyl Chloride Copolymer and Polyester Polyurethane Resin in the Lower Layer A magnetic tape is produced by the same method as in Experiment 3 except that the compounding ratio of a vinyl chloride copolymer and polyester polyurethane resin is changed as shown in Table 15.

The surface roughness Ra when the lower layer is formed by only one layer and when two layers are formed as the lower layer and the electromagnetic transduction characteristic of the produced magnetic tape are measured and the state of coating is evaluated. The state of coating is evaluated by observing the unevenness of coating on a coated face visually. Table 15 shows the result of measurement together with the compounding ratio of the vinyl chloride copolymer and polyester polyurethane resin in the lower nonmagnetic layer.

TABLE 15

| | Polyvinyl chloride polymerization degree 150 (weight) | Polyurethane resin (weight) | Surface roughness of single layer (nm) | Surface roughness in case of two layers (nm) | Output (dB) | State of coating |
|---|---|---|---|---|---|---|
| Experiment 107 | 20 | 0 | 2.4 | 2.6 | +5.9 | Satisfatory |
| Experiment 108 | 14 | 6 | 2.4 | 2.5 | +6.0 | Satisfactory |
| Experiment 109 | 10 | 10 | 2.6 | 2.8 | +5.8 | Satisfactory |
| Experiment 110 | 6 | 14 uneven | 3.5 | 5.1 | +4.4 | A little |
| Experiment 111 | 0 | 20 | 4.6 | 7.8 | +3.0 | Uneven |

As shown in Table 15, if a vinyl chloride copolymer the degree of polymerization of which is 180 or less and which includes metallic salt sulfonate as a polar group is included in the lower layer in the ratio of 50 percents by weight or more of the total binder, a satisfactory coated face with low surface roughness Ra and without the unevenness of coating can be obtained. This tells that it is desirable that a vinyl chloride copolymer the degree of polymerization of which is 180 or less and which includes metallic salt sulfonate as a polar group is also used in the lower layer in the ratio of 50 percents by weight or more of the total binder.

Examination of a Method of Combining Binders for the Upper and Lower Layers

A magnetic tape is produced by the same method as in Experiment 3 except that a vinyl chloride copolymer the degree of polymerization of which is the one shown in Table 16 and which includes a polar functional group of the type and the quantity shown in Table 16 is used for the lower nonmagnetic layer.

The surface roughness Ra when the lower layer is formed by only one layer and when two layers are formed as the lower layer and the electromagnetic transduction characteristic of the produced magnetic tape are measured and the state of coating is evaluated. Table 16 shows the result of measurement together with the polymerization degree of the vinyl chloride copolymer and the type and the quantity of the polar functional group in the lower nonmagnetic layer.

TABLE 16

|  | Type of polar group | Density (mol/g) | Polymerization degree |
| --- | --- | --- | --- |
| Experiment 112 | Sodium salt sulfonate | $5 \times 10^{-5}$ | 150 |
| Experiment 113 | Sodium salt sulfonate | $5 \times 10^{-5}$ | 180 |
| Experiment 114 | Sodium salt sulfonate | $1 \times 10^{-5}$ | 150 |
| Experiment 115 | Potassium salt sulfonate | $5 \times 10^{-5}$ | 150 |

|  | Surface roughness of single layer (nm) | Surface roughness in case of two layers (nm) | Output (dB) | State of coating |
| --- | --- | --- | --- | --- |
| Experiment 112 | 2.4 | 2.5 | +6.0 | Satisfactory |
| Experiment 113 | 2.7 | 3.0 | +5.6 | A little uneven |
| Experiment 114 | 2.7 | 2.9 | +5.7 | A little uneven |
| Experiment 115 | 3.0 | 3.3 | +5.5 | A little uneven |

As shown in Table 16, in Experiments 113 to 115 using a vinyl chloride copolymer which is different from a vinyl chloride copolymer used in the upper layer in the compounding ratio of 50 percents by weight or more, unevenness is observed on a coated face and surface roughness Ra is also high.

This tells that it is desirable that a vinyl chloride copolymer used in the upper layer in the compounding ratio of 50 percents by weight or more and a vinyl chloride copolymer used in the lower layer in the compounding ratio of 50 percents by weight or more are the same in a type.

Examination of a Base Film

A magnetic tape is produced by the same method as in Experiment 3 except that a base film consisting of material with thickness and Young's modulus shown in Table 17 is used. Young's modulus means a value in the direction of the longer side.

The state of coating of the produced magnetic tape is evaluated. Table 17 shows the result.

TABLE 17

|  | Base | Young's modulus [kg/mm$^2$] | Evaluation of coating |
| --- | --- | --- | --- |
| Experiment 116 | 4.5 μm Aramid | 1,100 | Satisfactory |
| Experiment 117 | 4.5 μm PET uneven | 650 | A little |
| Experiment 118 | 4.5 μm PET | 500 | Uneven |

As shown in Table 17, unevenness of coating is observed on a magnetic tape produced in Experiments 117 and 118 using a base film Young's modulus of which is smaller than 1,000 kg/mm$^2$. This unevenness of coating is caused by instability in running when coating is applied due to the shortage of the strength of a base. This tells that Young's modulus of a base film is required to be 1,000 kg/mm$^2$ or more.

Examination of a Method of Application

A magnetic tape is produced by the same method as in Experiment 3 except that when coating for the upper layer and coating for the lower layer are applied, coating for the upper layer is applied and dried after coating for the lower layer is applied and dried, that is, coating for the lower layer and coating for the upper layer are applied according to a wet-on-dry system.

As a result, as the set thickness of the upper layer is thin, coating for the upper layer does not extend on the lower layer evenly and a magnet tape is not completed.

As described above, a magnetic recording medium according to the present invention is a laminated coat type and as for the upper magnetic layer, the length of a major axis of metallic magnetic powder, the type of binder, the hardness and particle size of abrasive powder, the condition of kneading, the surface roughness Ra and the thickness are regulated, for the lower nonmagnetic layer, the length of a major axis of nonmagnetic powder, the ratio of the length of a major axis to that of a minor axis, the type and the type of binder are regulated, further as a method of forming the upper magnetic layer and the lower nonmagnetic layer, the thickness of nonmagnetic base material and young's modulus are regulated, a satisfactory electromagnetic transduction characteristic can be obtained in a high density recording area and a magnetic recording medium wherein satisfactory running durability can be obtained even if the overall medium is thinned and high density mass storage recording is enabled can be obtained.

What is claimed is:

1. A magnetic recording medium comprising:
    a lower nonmagnetic layer formed by dispersing a nonmagnetic powder consisting of hematite coated with a silicon compound or an aluminum compound in a first binder to provide a nonmagnetic coating and thereafter applying the nonmagnetic coating on a top surface of a nonmagnetic base material, the nonmagnetic base material also having a bottom surface,
    the magnetic recording medium further comprising an upper magnetic layer formed by dispersing a ferromagnetic powder in a second binder and thereafter combining the ferromagnetic powder and second binder with an abrasive powder slurry comprising an abrasive powder and binder dispersed in a solvent, the ferromagnetic powder, second binder, abrasive powder slurry, and solvent being kneaded together,
    the abrasive powder comprising an inorganic powder having a Moh's hardness of greater than 6 and further having a mean primary particle size which is less than 0.10 μm, a central particle size of the abrasive powder being smaller than 0.20 μm immediately before the abrasive powder slurry is combined with the ferromagnetic powder and second binder, the upper magnetic layer having a thickness ranging from 0.05 to 0.2 μm, the thickness of said upper magnetic layer being 1/5 or less of a total thickness of the lower nonmagnetic layer and the upper magnetic layer, the thickness of said upper magnetic layer being 1/20 or less of a thickness of the overall medium, the nonmagnetic powder having a major axis length that is less than 0.2 μm, a ratio of the major axis length of the nonmagnetic powder to a minor axis length of the nonmagnetic powder being greater than a ratio of a major axis length of the ferromagnetic powder to a minor axis length of the ferromagnetic powder, the ferromagnetic powder of the upper magnetic layer comprising a metallic magnetic powder wherein the metallic magnetic powder comprises particles having a mean length L of the major axis and the standard deviation a of the length of the major axis meeting the expression 0.01 μm<L+/−2σ<0.33 μm, the nonmagnetic base material having a thickness of less than 5 μm and a Young's modulus of greater than 1,000 kg/mm², and the upper magnetic layer having a surface roughness Ra measured by a noncontact optical surface roughness measurement instrument ranging from 2.4 nm to 4.0 nm and the surface roughness Ra of the upper magnetic layer being less than surface roughnesses Ra of both the top and bottom surfaces of the nonmagnetic base material.

2. The magnetic recording medium of claim 1 wherein the first binder constitutes at least 50 percent by weight of the lower nonmagnetic layer and the first binder comprises a vinyl chloride copolymer having an average degree of polymerization of less than or about 180 and which includes a metallic salt sulfonate as a polar group.

3. The magnetic recording medium of claim 1 wherein the second binder constitutes at least 50 percent by weight of the upper magnetic layer and the second binder comprises a vinyl chloride copolymer having an average degree of polymerization of less than or about 180 and which includes a metallic salt sulfonate as a polar group.

4. The magnetic recording medium of claim 1 wherein the first and second binders are the same.

5. The magnetic recording medium of claim 1 wherein the upper magnetic layer is applied on top of the lower nonmagnetic layer when the lower nonmagnetic layer is in a wet state.

* * * * *